United States Patent
Sheikholeslami et al.

(10) Patent No.: US 11,983,322 B2
(45) Date of Patent: May 14, 2024

(54) SYSTEMS AND METHODS FOR CONTROLLING A MULTI-ACTUATOR SYSTEM TO GENERATE A LOCALIZED HAPTIC EFFECT

(71) Applicant: IMMERSION CORPORATION, San Francisco, CA (US)

(72) Inventors: Majid Sheikholeslami, Burlington (CA); Juan Manuel Cruz Hernandez, Westmount (CA); Danny A. Grant, Montréal (CA); Vahid Khoshkava, Laval (CA); Jamal Saboune, Montreal (CA); Christopher Ullrich, Ventura, CA (US)

(73) Assignee: IMMERSON CORPORATION, San Francisco, CA (US)

( * ) Notice: Subject to any disclaimer, the term of this patent is extended or adjusted under 35 U.S.C. 154(b) by 227 days.

(21) Appl. No.: 17/506,148

(22) Filed: Oct. 20, 2021

(65) Prior Publication Data

US 2023/0122318 A1 Apr. 20, 2023

(51) Int. Cl.
*G06F 3/01* (2006.01)
*G08B 6/00* (2006.01)

(52) U.S. Cl.
CPC .............. *G06F 3/016* (2013.01); *G08B 6/00* (2013.01)

(58) Field of Classification Search
CPC ...... G06F 3/016; G06F 2203/014; G08B 6/00
See application file for complete search history.

(56) References Cited

U.S. PATENT DOCUMENTS

| | | | |
|---|---|---|---|
| 10,395,489 B1* | 8/2019 | Cruz-Hernandez | ..... G06F 3/016 |
| 10,504,342 B1 | 12/2019 | Khoshkava et al. | |
| 10,579,146 B2 | 3/2020 | Cruz-Hernandez et al. | |
| 10,649,532 B2 | 5/2020 | Cruz-Hernandez et al. | |
| 2018/0301140 A1* | 10/2018 | Turcott | .................. G06N 3/044 |

* cited by examiner

*Primary Examiner* — Quan Zhen Wang
*Assistant Examiner* — Mancil Littlejohn, Jr.
(74) *Attorney, Agent, or Firm* — Nath, Goldberg & Meyer; Gregory B. Kang; Morgan D. Rosenberg (57) ABSTRACT

In aspects, zoned haptic effects are provided by assigning a plurality of zones corresponding to each of a plurality of zone actuators for providing haptic effects. A desired haptic response is provided for zones selected for actuation, and the response by the zone actuators is detected. Adjacent and non-adjacent zones are assigned for the detected zones as being driven by any of the plurality of zone actuators. Vibration on the adjacent and non-adjacent zone is suppressed in accordance with control parameters associated with the respective adjacent and non-adjacent zones. If a duration of the provided haptic effect has not passed, the suppression of vibration in the adjacent and non-adjacent zones is maintained and if the duration has passed, the suppression of vibration is terminated. Numerous other aspects are provided.

14 Claims, 11 Drawing Sheets

SYSTEMS AND METHODS FOR CONTROLLING A MULTI-ACTUATOR SYSTEM TO GENERATE A LOCALIZED HAPTIC EFFECT

CROSS-REFERENCE TO RELATED APPLICATION

The present Application for Patent is related to co-pending U.S. patent application Ser. No. 17/506,035, filed Oct. 20, 2021, titled "Apparatus and Methods for Localizing One or More Effects in a Haptic Interface", filed on even date herewith, which is commonly assigned and hereby incorporated by reference herein in its entirety.

BACKGROUND

Technical Field

The present disclosure relates to electronic devices that produce one or more haptic effects in response to inputs and other events occurring on electronic devices, and in particular to control of haptic effects on human interface devices to provide a localized haptic effect.

Background Art

Electronic devices, such as mobile devices, personal computers, home video game consoles, handheld video game consoles, microconsoles, automotive vehicle displays, etc., typically use visual and auditory cues to provide feedback to a user. In some electronic devices, kinesthetic feedback (e.g., active and resistive force feedback) and/or tactile feedback (e.g., vibration, texture, temperature variation, etc.) may be provided to the user. In general, such feedback is collectively known as "haptic feedback" or "haptic effects". Such electronic devices use one or more processors or application specific integrated circuits (ASICs) to control circuitry and process program instructions. Collectively, such electronic devices are referred to as "computers" or "computing devices", and the controlling circuitry, including processors, ASICs and similar processing devices are referred to as "processors".

Haptic effects provide cues that enhance a user's interaction with an electronic device, from augmenting simple alerts to specific events to creating a greater sensory immersion for the user within a simulated or virtual environment. Haptic effects enhance interactive touch displays with programmable digital buttons, localized haptics and more.

In some haptic feedback systems, the haptic effect tends to "ring" or continue after the initial effect, sometimes called "sustain". In multi-zone haptic interfaces, this sustain may extend to nearby zones, which also results in the haptic not being localized to an intended zone. Thus, improved methods and apparatus for controlling a haptic feedback system are desired.

SUMMARY

In an aspect, a method of providing a haptic effect in a first zone of a plurality of predetermined zones is provided. The method comprises controlling at least one actuator included in the first zone to provide the haptic effect, determining at least one of an adjacent zone of the first zone and a non-adjacent zone of the first zone, and controlling at least one actuator included in the determined at least one adjacent zone and non-adjacent zone to reduce or suppress the haptic effect in such zone.

In an aspect, an apparatus for providing a haptic effect in a first zone of a plurality of predetermined zones is provided. The apparatus comprises a processor configured to control at least one actuator included in the first zone to provide the haptic effect, determine at least one of an adjacent zone of the first zone and a non-adjacent zone of the first zone, and control at least one actuator included in the determined at least one adjacent zone and non-adjacent zone to reduce or suppress the haptic effect in such zone.

In an aspect, a computer program product is provided. The computer program product, comprises a non-transitory computer-readable medium having one or more instructions thereon that, when executed by a processor, cause the processor to control at least one actuator included in the first zone to provide the haptic effect, determine at least one of an adjacent zone of the first zone and a non-adjacent zone of the first zone, and control at least one actuator included in the determined at least one adjacent zone and non-adjacent zone to reduce or suppress the haptic effect in such zone.

In aspects, zoned haptic effects are provided within predetermined zones through a plurality of zone actuators. Plural zones corresponding to respective zone actuators on a surface for providing haptic effects are assigned, and a desired haptic response for zones for actuation is determined. The driving any of the plural zones is detected and adjacent and non-adjacent zones for the driven zones is assigned for the detected zones. For non-adjacent zones, vibration on the non-adjacent zone is suppressed with control parameters associated with that non-adjacent zone, and for adjacent zones, vibration is suppressed with control parameters associated with that adjacent zone. Effect parameters are set for any of the plurality of zone actuators being driven in the plurality of zones. At least one haptic effect is played on the plurality of zones being driven by any of the plurality of zone actuators. Vibration is suppressed on the driven ones of the plurality of zones selected for actuation according to the desired haptic response for the zones selected for actuation, with control parameters associated with the driven ones of said zones selected for actuation. A determination is made if a predetermined duration of the provided haptic effect has passed, and if the duration has not passed, suppression of vibration in the adjacent and non-adjacent zones is continued. If the duration has passed, the haptic effect and the suppression of vibration is terminated. Numerous other aspects are provided.

BRIEF DESCRIPTION OF THE DRAWINGS

FIGS. 7A, 7B and 7C are schematic block diagrams showing implementations of a non-linear controller that actively drives the actuator to reduce or suppress vibration with a proportional integral controller after the desired effect has been played.

DETAILED DESCRIPTION

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. Terms such as "comprise," "comprises," "comprising," "include," "includes," "including," "such as," "has," and "having" are interchangeable and not intended to be limiting. For example, the term "including" shall mean "including, but not limited to".

Vibration suppression techniques and apparatus using multiple actuators are disclosed. The vibration suppression can localize the haptic effect to an identified location, and/or can produce crisper haptic effects. This increases the realism of the haptic effect, provides a more pleasing haptic effect and presents a closer association between the haptic effect and the identified location.

Localized haptics is important for large displays. By defining specific zones on the display, while playing haptic effect on one zone, other zones are controlled by this control technique to reduce or suppress undesired vibration propagation and provide localized haptic effect.

In aspects, the present methods and apparatus may employ Active Sensing Technology (AST) from Immersion® Corporation. AST may implement closed loop control for reducing and/or suppressing vibration. The disclosed techniques work with Active Sensing Technology (AST) systems and non-AST systems. Basic Active Sensing Technology (AST) is a controller that actively drives the actuator to suppress vibration after the desired effect has been played. In considering the dynamic behavior of inertial resonant actuators, phase compensation controllers were added as part of the controller. Enhancements were developed that improve on the basic AST controller design. Active Sensing Technology uses some of the techniques described in U.S. Pat. No. 9,248,840. An AST or non-AST system can also incorporate proportional suppression, sometimes referred to as a "brake controller".

Figure 1:
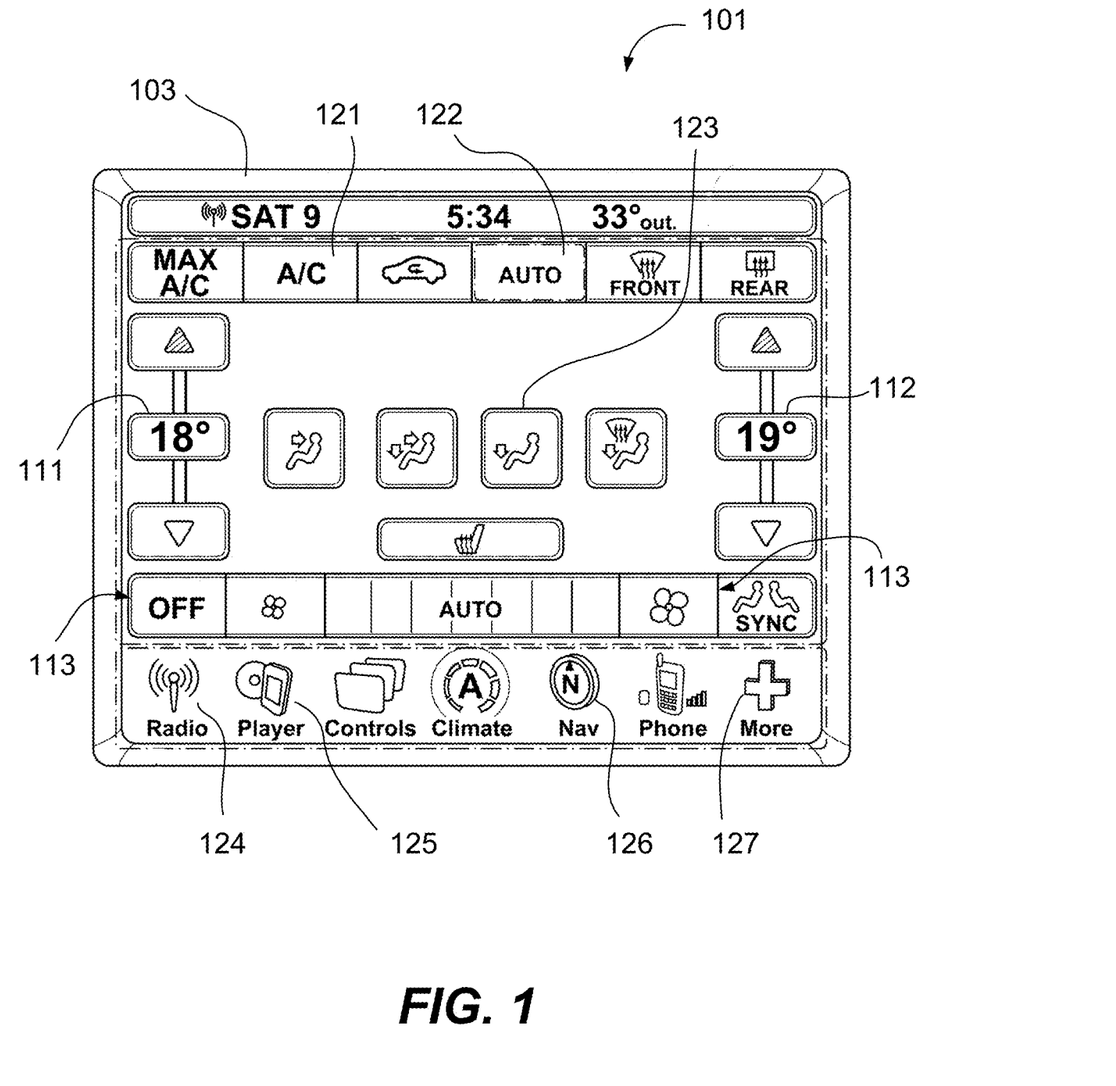
FIG. 1 is a schematic diagram showing a non-limiting example of a haptic interface, provided as an automotive touch screen in accordance with aspects.

FIG. 1 is a schematic diagram showing a non-limiting example of a haptic interface 101, provided as an automotive touch screen, in which the disclosed technology may be implemented in conjunction with in-dashboard automotive panel, such as a touch surface, control panel, display or the like. In the example, the user interface is a viewable area of the in-dashboard automotive panel, and a frame 103 is the dashboard mounting portion of the automotive panel. The usage of the system in a haptic interface 101 as an automotive panel is discussed for non-limiting exemplary purposes only, and that the discussion of dashboard mounting is similarly for non-limiting exemplary purposes only. As further non-limiting examples, such panels may be mounted on doors, in a center console area, and/or on the steering wheel.

The automotive touch screen may display control features such as linear sliders 111-113, icons or "buttons" icons 121-127 for selecting items- or possibly open additional menus, and dials. The various control features take various characteristics, such as detents, fine detents suggestive of friction or control movement, stack effects which vary according to increased or decreased levels, button clicks and circular dials with effects. The various control features can have simple clicks, simulations of rheostat-type moments, detent clicks and the like. For some controls, movement can be accompanied by a change in haptic "tone" or feel, suggestive of increase, decrease or providing a haptic detent representing an adjustment to a maximum range, such as full fan output. Additionally, since the user can often touch a target location on the control, the control can rapidly animate a move to the target, while providing a desired haptic effect simulating the animated movement.

Linear sliders can have effects of a stack sharp, high-definition haptic effects close together to create a sliding scale. Button clicks and circular dials can have effects of hitting a target acceleration to replicate button clicks realistically and dial turns to replace mechanical buttons and dials. Surface textures and edge detection can create an illusion of a tactile surface for button detection with fine-grain haptic effects. Localized effects enable a fluid interface with the localization of haptic effect playback based on user interaction with the digital touchscreen. Programmability can be used to increase user interface flexibility with an upgradable software-based haptic design. Multi-effect implementation can be used to provide a variety of effects on a single surface with the same actuator.

The present methods and apparatus may be used to control multi-actuator system and play localized haptic effects on a continuous large plate or a plate with multiple segmented zones. In aspects, the plate is divided into a number (e.g., a fixed number) of zones one or more of which (e.g., each) are controlled by a closed-loop system with an associated actuator and an accelerometer. A haptic effect with specific drive signal (e.g., defined by amplitude, frequency and/or number of cycles) is playing on driven zones. The haptic effect can be played in any other vibration format. In aspects, the present technique uses a closed loop controller. In aspects, the closed loop controller may employ AST from Immersion® Corporation. A closed loop controller provides several advantages:

A closed-loop controller suppresses vibration on each adjacent zone with associated control parameters.

A closed-loop controller suppresses vibration on each non-adjacent zone with associated control parameters.

A closed-loop controller implemented in Active Sensing Technology (AST) from Immersion® Corporation brakes the signal to create sharp effect on driven zones. Other control paradigms can also be used to suppress the driven zone vibration. This step is optional for higher haptic fidelity.

To improve the performance of the closed loop controller, and considering the dynamic behavior of inertial resonant actuators, phase compensation controllers are added as part of the overall controller. In one configuration a lead/lag compensator is placed in series with a PID or Proportional-Integral-Derivative controller (e.g., AST controller). In a second configuration the PID controller is replaced with lead/lag and lag/lead controllers. The advantage of using this style of controller is increased vibration reduction and/or suppression as well as more robust and easier tuning of the controller. With additional control parameters, improved and/or optimized tuning is more achievable.

In general, the controller of each zone can be considered as a Multi-Input/Multi-Output (MIMO) control system. As a practical alternative, a simpler Single-Input/Single-Output (SISO) control system can be implemented. As a non-limiting example used for explanation of the described techniques, the vibration suppression controller of the multi-actuator system can be presented as a set of six MIMO or SISO controllers.

Localized haptic effects can be achieved by the definition of and/or designation of adjacent and non-adjacent driven zones, each controlled by a closed-loop system with an associated actuator and an accelerometer. A haptic effect with a specific drive signal is played on one or more driven zones. The haptic effect can be played using any format, such as a vibration format or different type of haptic format. A closed-loop controller may in some aspects use Active Sensing Technology (AST) to brake the signal and create a sharp effect on the driven zones. The use of closed-loop control employing AST from Immersion® Corporation is given by way of non-limiting example. Alternatively or additionally, other control paradigms can also be used to reduce or suppress the driven zone vibration or haptic effect. While braking effects and the like are described, it is also possible to use other systems used to provide higher haptic fidelity.

In aspects, the present methods and apparatus can be used to reduce the area or space covered by a given haptic effect, and thereby localize the haptic effect, which is distinct from AST. This can make the haptic effect more realistic, and at the same time reduce and/or avoid presenting the haptic effect at locations on a user interface for which the haptic effect is not desired.

As a non-limiting example, in an automotive interactive display interface, the display can be mounted on the dashboard, door panel, center console, steering wheel, etc., and provide the usual control functions. When the display is too large for inherent localization, and there are for example two users interacting with the display, localized haptics provides an advantage in that an effect played for a first on one side of the display will not transmit to the other side. Therefore the haptic experience for a second would not be compromised by the haptics generated in response to the actions of the first user.

It is noted that, in a configuration having multiple zones used for haptic effects, respective ones of the multiple zones may be driven at different times. Additionally, the zones for which haptic effects are not intended may have be driven with signals intended to reduce or suppress vibration or other effects resulting from the production of haptic effects in zones for which the haptic effects are intended.

A closed-loop controller is used to reduce or suppress vibration on one or more (e.g., each) adjacent zone having associated control parameters. The closed-loop controller can be used to reduce or suppress vibration on each non-adjacent zone with associated control parameters.

In one configuration, one or more adjacent zones are controlled with a large (e.g., maximum applicable) feedback gain to achieve improved (e.g., optimized) vibration suppression and one or more (e.g., each) non-adjacent zones are controlled with equal or lower feedback gain. The haptic player and vibration suppression controllers may be decoupled, which allows them to follow different paradigms.

The control paradigm is used to demonstrate the desired haptic effect and to separate the haptic effects per zone. In aspects, the controller of each zone can be considered as a separate actuation circuit. In aspects, at least one actuator included in at least one adjacent zone and non-adjacent zone can be used to reduce or suppress the haptic effect in such respective zones based, at least in part, on feedback information associated with the at least one actuator included in the first zone (e.g., in which the haptic effect is desired) and can feed forward information associated with the at least one actuator included in the first zone.

As a non-limiting example used for explanation of the described techniques, the vibration suppression controller of the multi-actuator system can be presented as a set of six controllers in a Multi-Input/Multi-Output (MIMO) control system or, as a practical alternative, as six controllers in a simpler Single-Input/Single-Output (SISO) control system. The control paradigm is used to demonstrate the desired haptic effect and to separate the haptic effects per zone. For purposes of this disclosure, "driven zones" are intended to describe zones driven to produce a given haptic effect, and the other zones, which may or may not be driven, are described as "adjacent zones" and "non-adjacent zones".

Figure 2A:
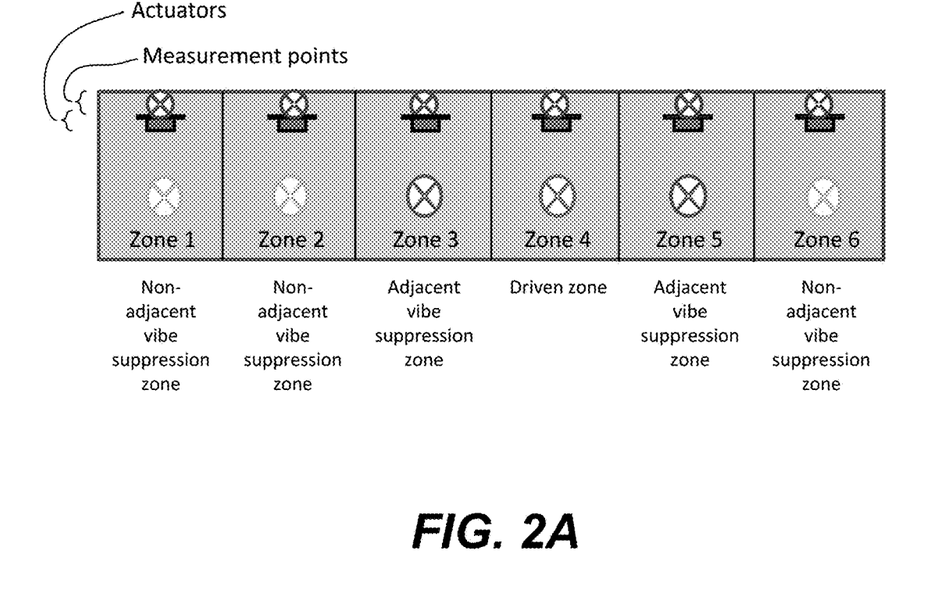
FIG. 2A illustrates a zone configuration of an apparatus in accordance with aspects.

FIG. 2A illustrates a zone configuration of an apparatus in accordance with aspects.

Figure 2B:
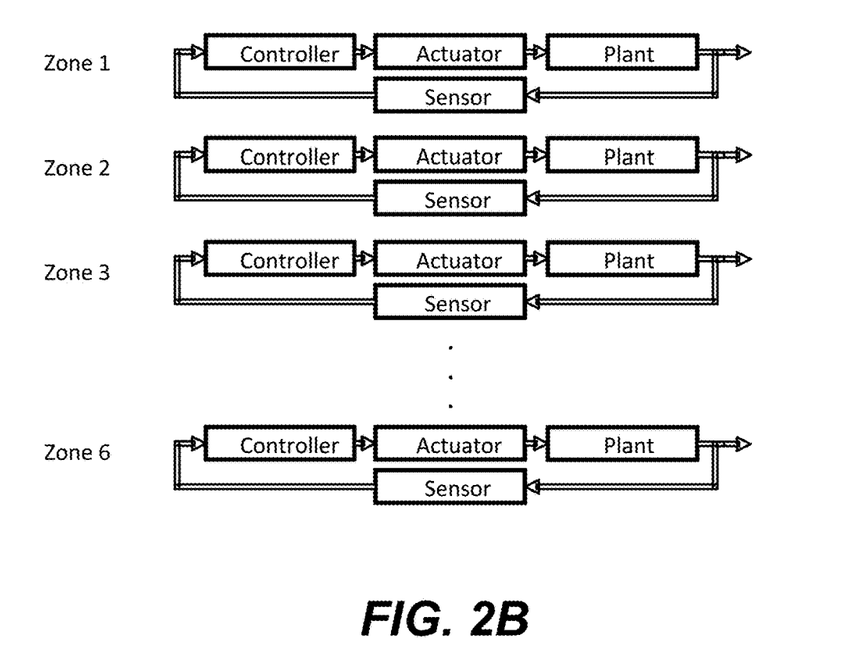
FIG. 2B illustrates a six single-input/single-output (SISO) controllers of a haptic controller system in accordance with aspects.

FIG. 2B illustrates a six single-input/single-output (SISO) controllers of a haptic controller system in accordance with aspects. By way of non-limiting example, the vibration suppression controller of the multi-actuator system can be implemented as the set of six SISO or MIMO controllers. In the example, each zone has a measurement point. If, for example, zone 4 is a driven zone, zones 3 and 5 would be adjacent actuator zones. For example, the vibration suppression zones. Zones 1, 2 and 6 would therefore be non-adjacent actuator zones. The adjacent and/or non-adjacent actuator zones would be vibration suppression zones to the extent that vibration suppression is required. In one or more of such zones (e.g., each) zone, a sensor provides a signal to a controller, which controls an actuator. The actuator causes the haptic effect at a plant, which in turn is sensed by the sensor. The term "plant" is associated with a actuator, and so the word "plant" in this context is a well-known term of art referring to the combination or interface between an actuator and screen or other surface to which the actuator transmits haptic effects.

Figure 3:
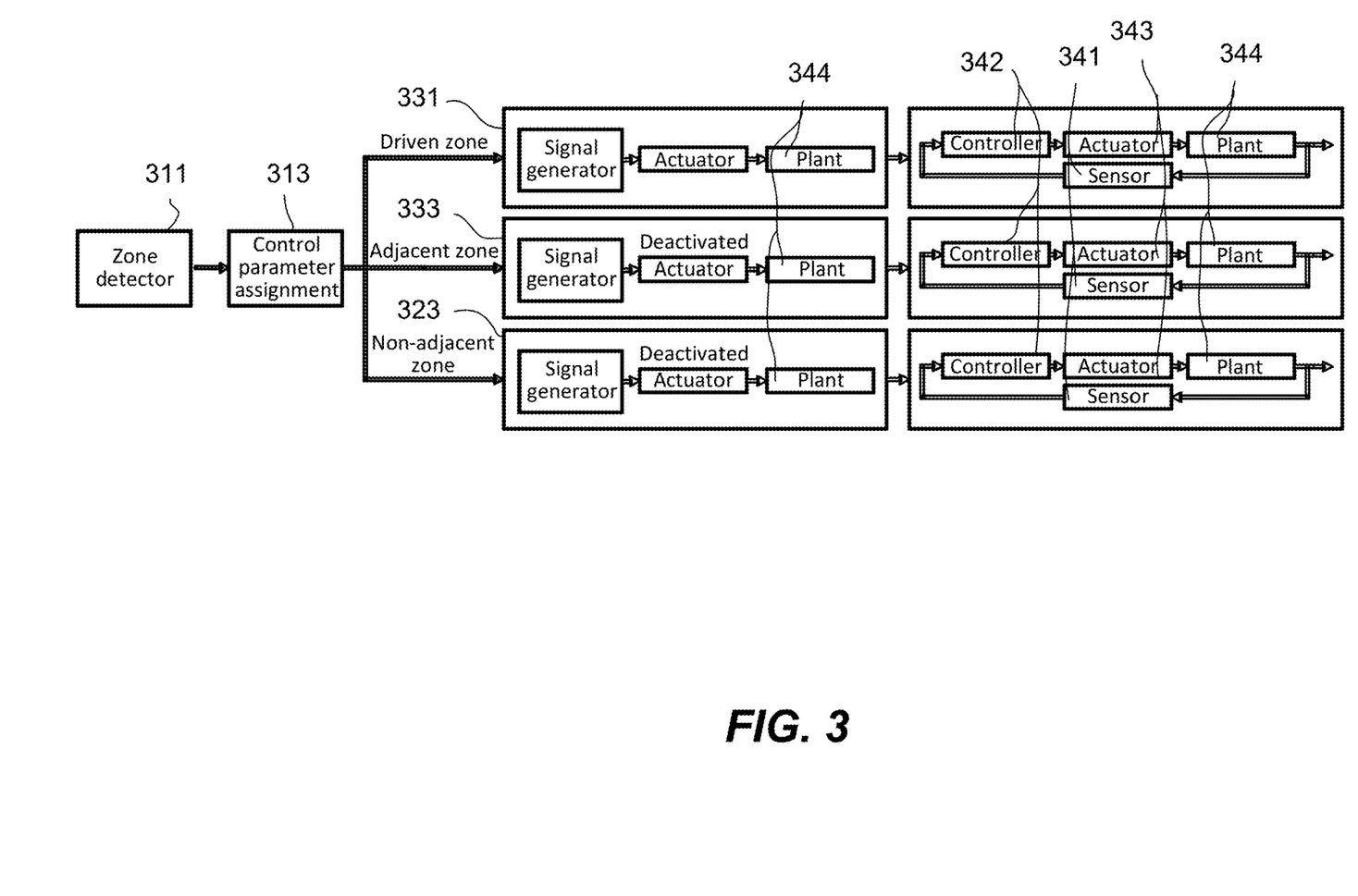
FIG. 3 is a schematic block diagram of an example control system for controlling a multi-actuator system to generate a localized haptic effect in accordance with aspects.

FIG. 3 is a schematic block diagram of an example control system for controlling a multi-actuator system to generate a localized haptic effect in accordance with aspects For the driven zones, a signal generator will play the haptic effect and the closed loop controller will suppress the vibration to create the desired sharp effect. Adjacent and non-adjacent zones each utilize the same closed-loop controller format, with different feedback and gain parameters. Depicted in FIG. 3 is zone detector 311, control parameter assignment 313, and three example zones, driven zone 321, adjacent zone 322 and non-adjacent zone 323. Each zone 321, 322, 323 has a signal generator 331, an actuator 332 and a plant 333. Zones 321, 322, 323 are controlled by sensors 341, controllers 342, actuators 343 having an effect at plant 344 in a manner as described above in connection with FIGS. 1A and 1B.

Figure 4:
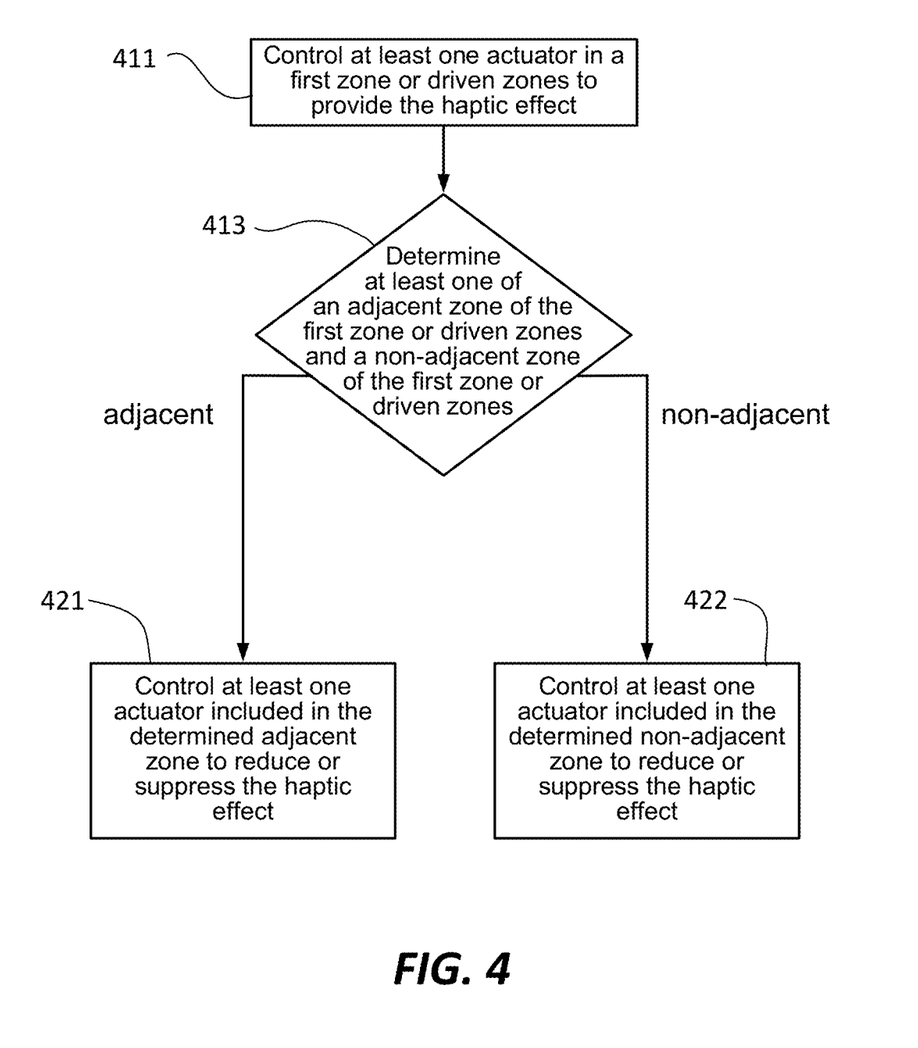
FIG. 4 is a flow chart illustrating a method of providing a haptic effect in a first zone of a plurality of predetermined zones in accordance with aspects.

FIG. 4 is a flow chart illustrating a method of providing a haptic effect in a first zone of a plurality of predetermined zones in accordance with aspects. A haptic effect is provided in a first zone or one or more driven zones in an array of plural haptic zones. At least one actuator is controlled (step 411) in the first zone or one or more driven zones in order to provide the haptic effect. A determination is made (step 413) of at least one of an adjacent or non-adjacent zone for a non-driven zone. At least one actuator included in the adjacent zones (step 421) and non-adjacent zones (step 423) is controlled to reduce or suppress the haptic effect in such zone.

Figure 5:
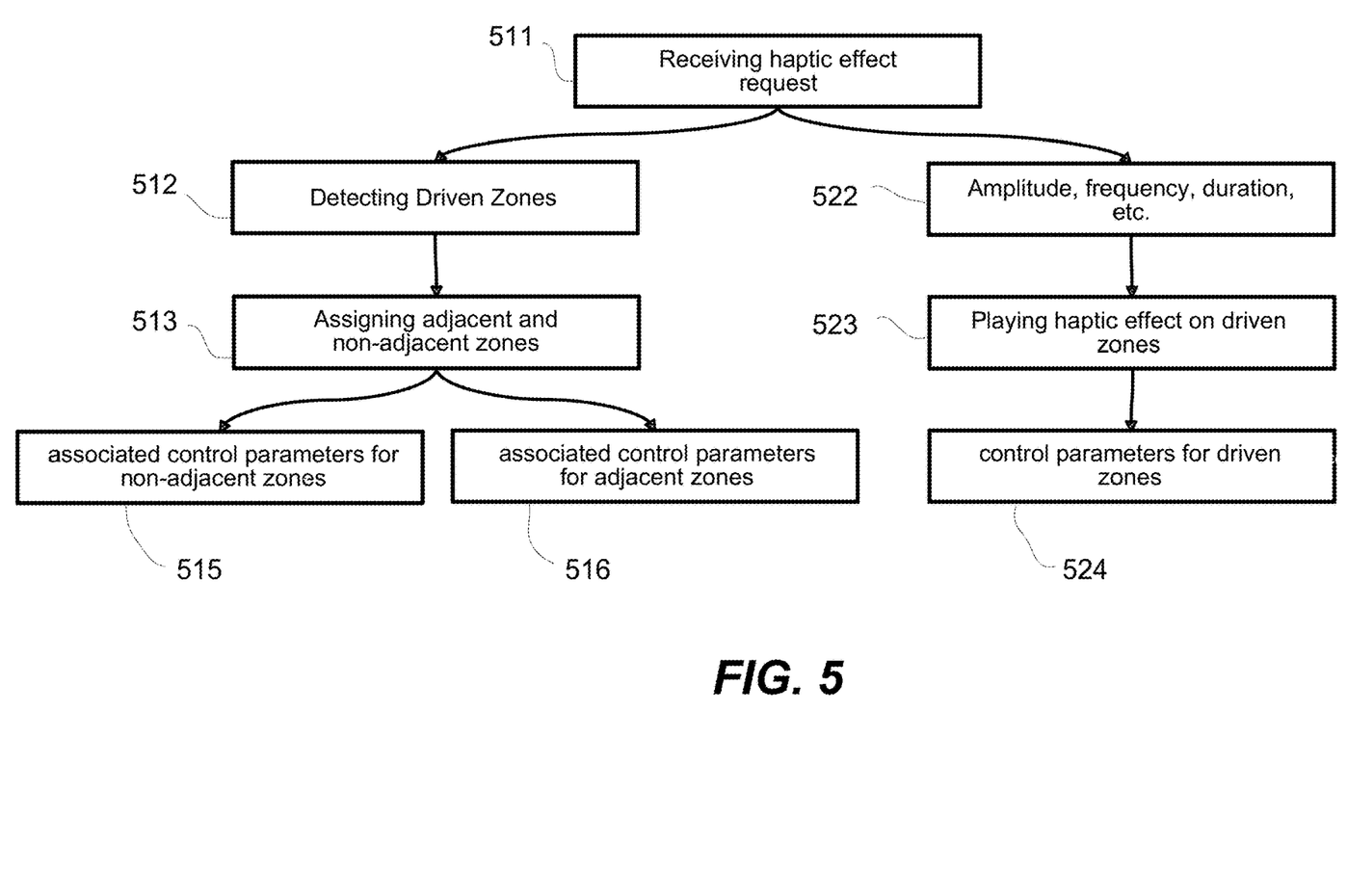
FIG. 5 is a flow chart showing an example process of controlling the system to achieve localized haptics by suppressing unwanted vibrations in non-driven zones in accordance with aspects.

FIG. 5 is a flow chart showing a process of controlling the system to achieve localized haptics by reducing and/or suppressing unwanted vibrations in one or more non-driven zones. A haptic request is received (step 511), and the one or more driven zones are detected (step 512). One or more adjacent and non-adjacent zones are determined, defined and/or assigned (step 513), and according to the determination, definition and/or assignment, vibration is reduced and/or suppressed on non-adjacent zones (step 515) with associated control parameters for the non-adjacent zones, and vibration is reduced and/or suppressed on adjacent zones (step 516) with associated control parameters for the adjacent zones.

Also, responsive to the received haptic request (step 511), effect parameters are set (step 522), the haptic effect is played on the one or more driven zones (step 523) and vibration is reduced and/or suppressed on the one or more driven zones (step 524) in accordance with associated control parameters for the one or more driven zones. Thus, the haptic effect is treated differently for the one or more driven zones, the one or more adjacent zones and the one or more non-adjacent zones.

Figure 6:
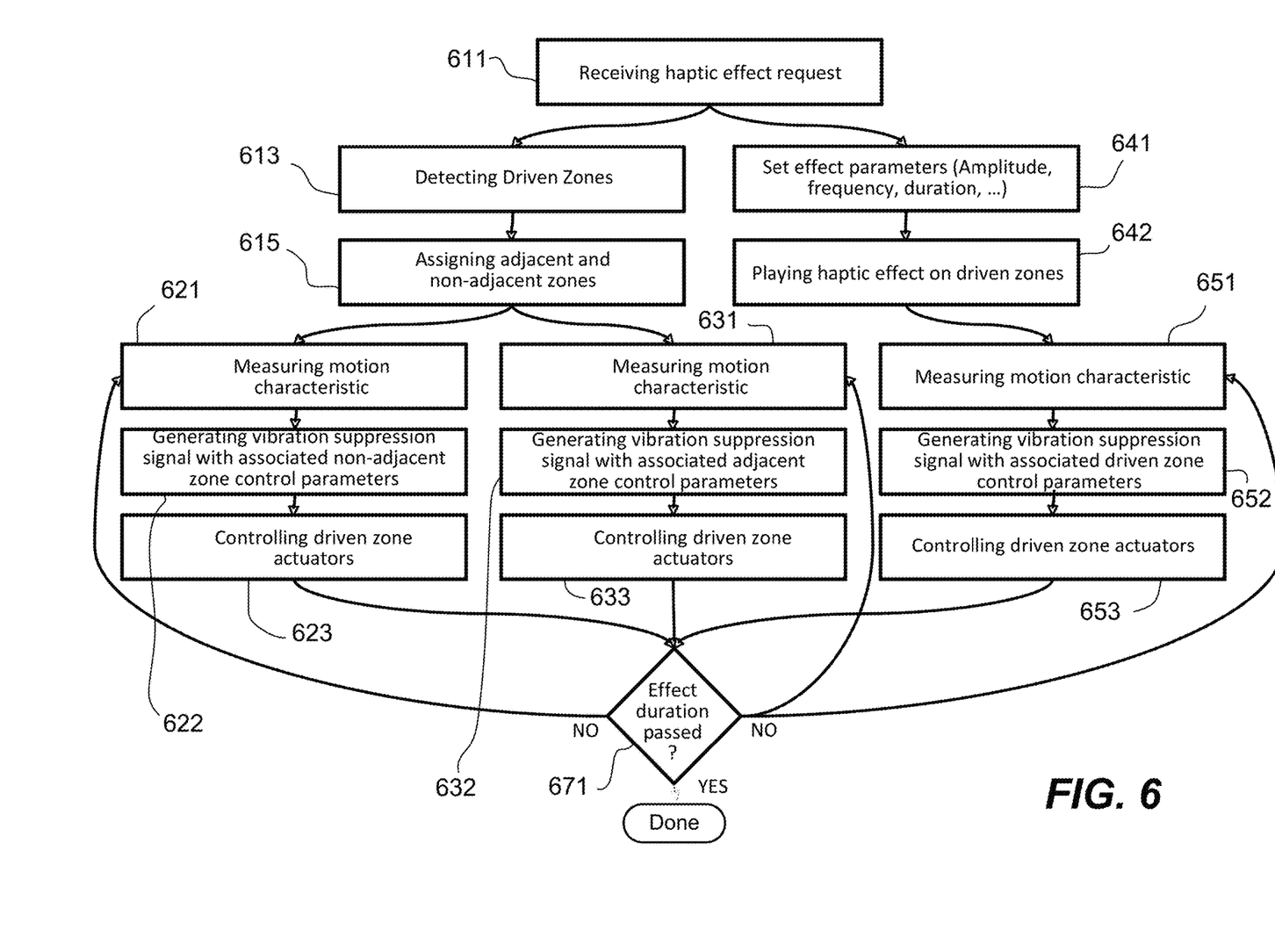
FIG. 6 is a flow chart showing the process in more detail, showing the control of actuators in the non-adjacent zones, adjacent zones and driven zones for the duration of the haptic effect in accordance with aspects.

FIG. 6 is a flow chart showing the process in more detail, showing the control of actuators in the non-adjacent zones, adjacent zones and driven zones for the duration of the haptic effect.

A haptic effect request is received (step 611). One or more driven zones are determined, detected (step 613) and/or identified, and one or more adjacent and non-adjacent zones are determined, defined, assigned (step 615) and/or identified. For the one or more non-adjacent zones motion characteristics are measured (step 621), vibration reduction and/or suppression signals are generated (step 622) according to associated non-adjacent zone control parameters, and driven zone actuators for the non-adjacent zones are controlled (step 623). For the one or more adjacent zones motion characteristics are measured (step 631), vibration reduction and/or suppression signals are generated (step 632) according to associated adjacent zone control parameters, and driven zone actuators for the adjacent zones are controlled (step 633).

Haptic effect parameters are set (step 641) and the haptic effects are played on one or more driven zones (step 642). Motion characteristics are measured (step 651) and vibration reduction and/or suppression signals are generated (step 652) in accordance with associated driven zone control parameters. The vibration control parameters are used to control (step 653) the one or more driven zone actuators. In this manner, a short, crisp haptic effect may be provided to a driven zone.

A determination is made whether the haptic effect duration has passed (step 671) and if not, the steps of measuring non-adjacent motion characteristics (step 621), measuring adjacent motion characteristics (step 631), and measuring motion characteristics for the driven zones (step 651) are repeated to loop the process until the determination (step 671) indicates that the haptic effect duration has passed.

Figure 7A:
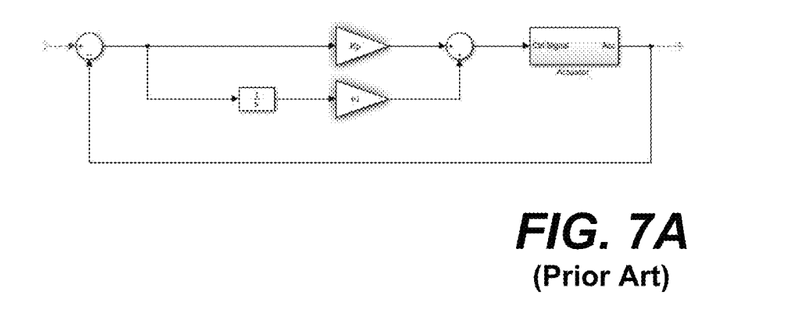
FIG. 7A shows a basic brake controller.
Figure 7B:
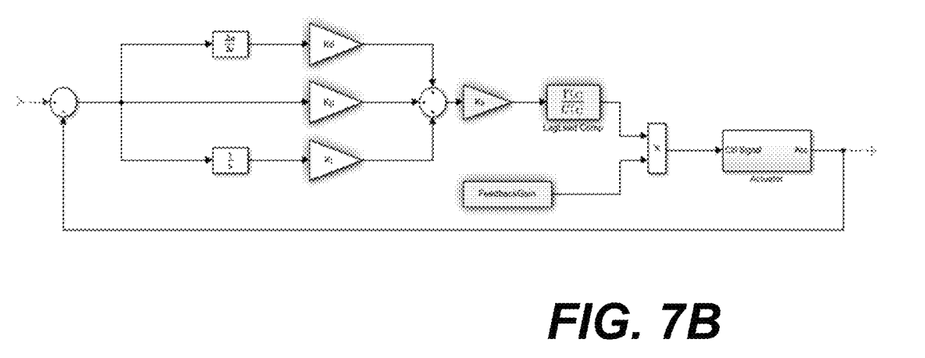
FIG. 7B shows a lead/lag compensator is placed in series with the controller in accordance with aspects.
Figure 7C:
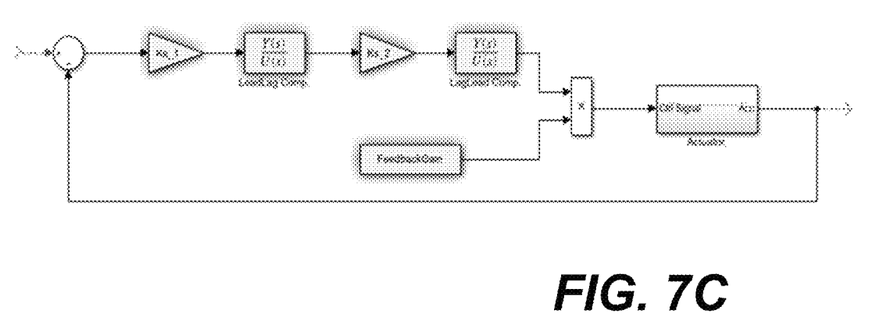
FIG. 7C shows the controller is replaced with lead/lag and lag/lead controllers in accordance with aspects.

FIGS. 7A, 7B and 7C are schematic block diagrams showing an implementation of a closed-loop technique to reduce or suppress undesired vibration in each zone. As a non-limiting example, the implementation uses Active Sensing Technology (AST), but can also be used with otherwise linear controllers. AST is a controller that actively drives the actuator to suppress vibration with a proportional integral controller after the desired effect has been played, to produce a sharp haptic effect. FIG. 7A shows a basic brake controller implementing the non-linear control according to existing techniques. According to the disclosed techniques, the AST is implemented as an enhanced active sensing controller because it has the capability of suppressing the multiple zones. In aspects, AST may be a non-linear control technique that actively drives the activator to reduce and/or suppress vibration with a proportional integral controller after the desired effect has been played.

While AST is described in this non-limiting example, the disclosed techniques can be used in any haptic output in which multiple zones of haptic response are desired. A vibration suppression controller to control adjacent and non-adjacent zones in order to reduce and/or minimize the vibration propagation. In this sense, AST may be used to provide the desired effect, whereas control adjacent and non-adjacent zones is effected in order to reduce and/or minimize the vibration propagation. This provides advantages in the nature of the controller parameters.

In a non-limiting implementation, there are two controllers (e.g., or groups of controllers) in this system:
  An AST or a non-AST haptic effect controller to play the effect, and
  A vibration suppression controller to control adjacent and non-adjacent zones in order to reduce and/or minimize the vibration propagation.

A distinction between these two controllers is the nature of the controller parameters. The haptic effect controller parameters are effect parameters, such as frequency, and amplitude, whereas control parameters for a vibration suppression controller are tunable parameters such as PID gain and feedback gain. A vibration suppression controller to control one or more adjacent and/or one or more non-adjacent zones in order to reduce and/or minimize the vibration propagation may be used to modify an AST framework as an enhancement; however, the two control techniques are different.

Enhancements used in the enhanced active sensing controller are used to improve the AST controller operation. In considering the dynamic behavior of inertial resonant actuators, phase compensation controllers are added as part of the controller. The schematic diagrams of FIGS. 7B and 7C show two implementations of AST. In one configuration, depicted in FIG. 7B, a lead/lag compensator is placed in series with the controller of the AST. In a second configuration, depicted in FIG. 7C, the controller is replaced with lead/lag and lag/lead controllers. Advantages of these controllers are the ability to increase vibration suppression as well as provide more robust and easier tuning of the controller. By offering the ability to include additional tuning parameters, optimized tuning is more achievable.

Figure 8A:
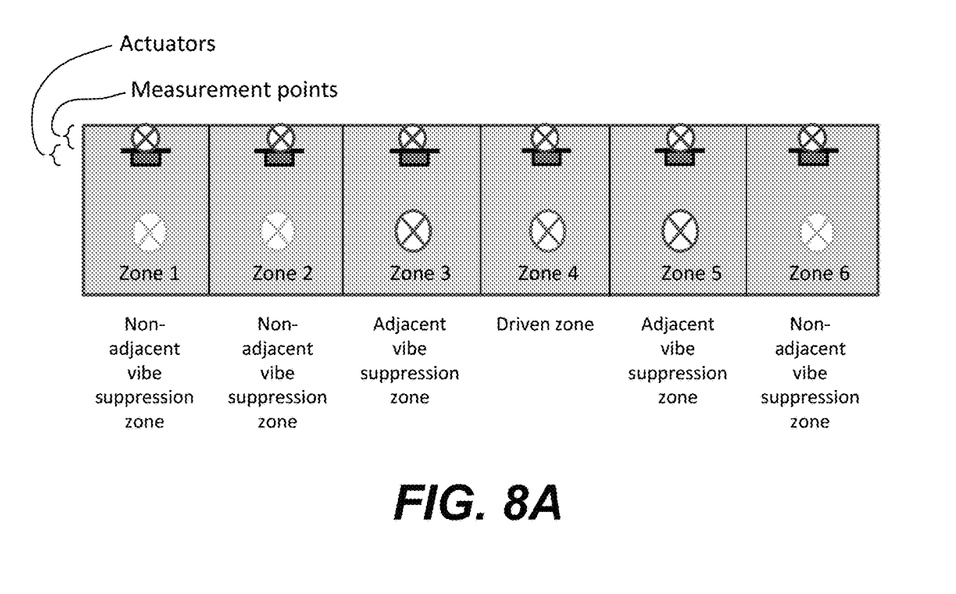
FIG. 8A shows a zone configuration of an apparatus in accordance with aspects.
Figure 8B:
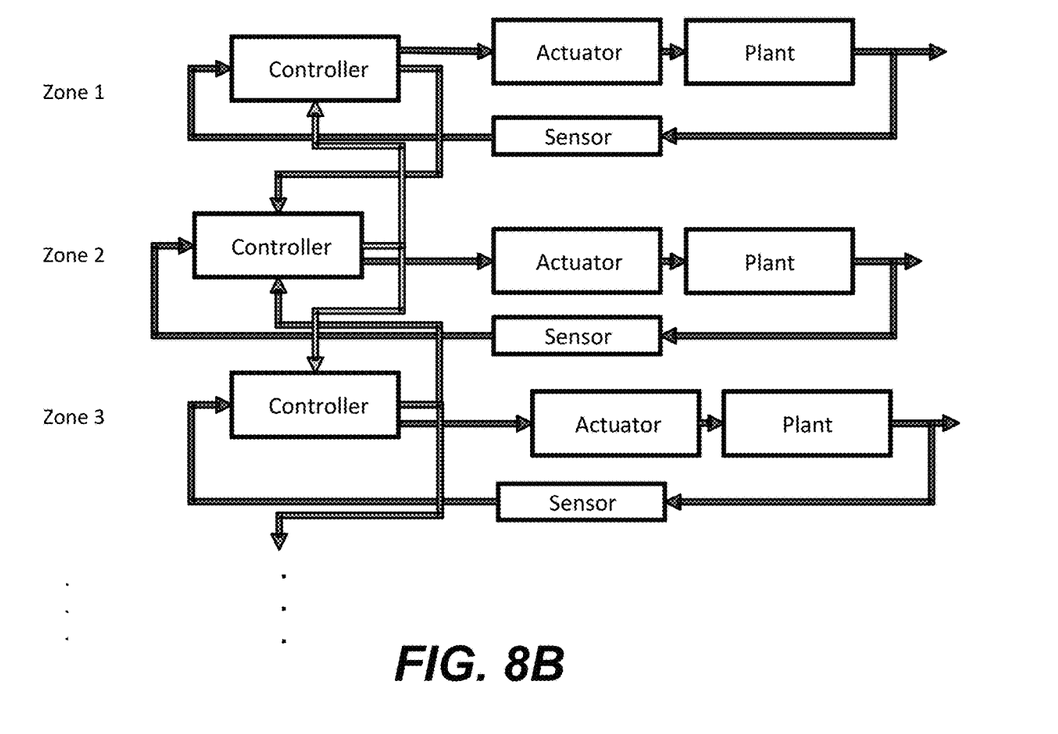
FIG. 8B a multiple-input/multiple-output (MIMO) controller of a haptic controller system in accordance with aspects.

FIG. 8A shows a zone configuration of an apparatus in accordance with aspects. FIG. 8B a multiple-input/multiple-output (MIMO) controller of a haptic controller system in accordance with aspects. As is the case with the SISO controller of FIGS. 2A and 2B, the vibration suppression controller of the multi-actuator system can be implemented as the set of multiple controllers, which in this case are MIMO controllers. In the example, each zone has a measurement point. If, for example, zone 4 is a driven zone, zones 3 and 5 would be adjacent actuator zones, for example, the vibration reduction and/or suppression zones. Zones 1, 2 and 5 would therefore be non-adjacent actuator zones, which may also employ vibration reduction and/or suppression as non-adjacent vibration reduction and/or suppression zones.

In one or more zones (e.g., each zone), a sensor provides a signal to a haptic controller, which controls an actuator. The actuator causes the haptic effect at a plant, which in turn is sensed by the sensor. In contrast with the SISO configuration, the MIMO configuration implements a control linkage between each controller, providing control outputs from each controller to the other controllers (e.g., as input). This of course adds complexity to the control circuit or program, but also allows more precise control of the different zones.

Figure 9:
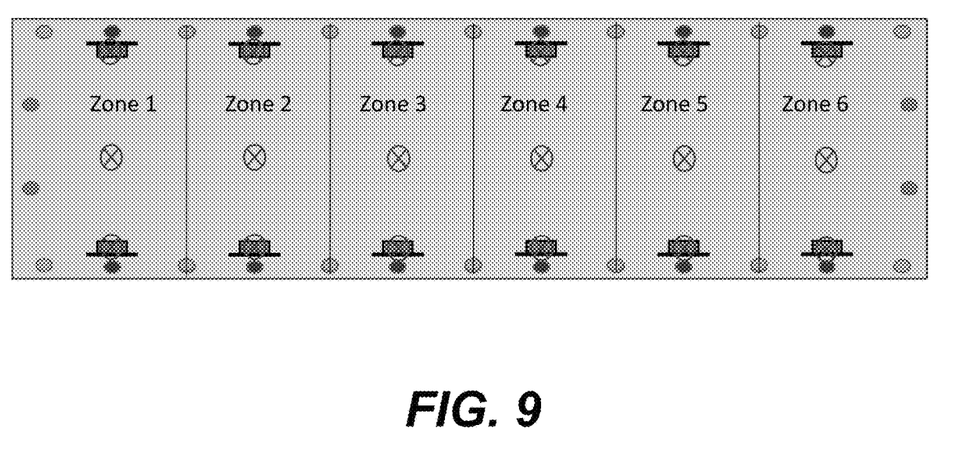
FIG. 9 is an example of a six-zone apparatus configuration used to show the effect of localization and quality in accordance with aspects.

FIG. 9 is an example of a six-zone MIMO configuration used to show the effect of localization and quality. Example results are given in Tables 1-8. Each zone has a pair of opposing top and bottom actuators, with measurements taken at the respective top and bottom actuators, and at respective middle points between the top and bottom actuators. The use with MIMO is given by way of example, and the control techniques can be used with a SISO controller.

Table 1 shows acceleration on a peak-to-peak (P2P) basis, with zone 6 actuated as the driven zone. The example uses a haptic effect at 160 Hz, with 10 Vpp (peak-to-peak driving voltage) driving EMF, running at 1.5 cycles. The 160 Hz is the frequency of the sine wave driving signal, whereas the 1.5 cycles is the number of cycles of that sine wave. For 1 cycle the duration of the driving signal is 1/160 sec., so for 1.5 cycles the duration is 1.5/160 sec.:

TABLE 1

Acceleration P2P (G)

|  | Zone 1 | Zone 2 | Zone 3 | Zone 4 | Zone 5 | Zone 6 |
|---|---|---|---|---|---|---|
| Actuation Point (Top) | 0.5 | 0.5 | 0.7 | 1.5 | 1.8 | 14.4 |
| Middle Point | 0.4 | 0.6 | 0.8 | 1.4 | 2.5 | 10.3 |
| Actuation Point (Bottom) | 0.6 | 0.6 | 0.6 | 0.8 | 1.8 | 14.9 |

Table 2 shows vibration reduction in the respective zones. (Zone 6, as the driven zone, is the source of the vibration, and therefore no vibration reduction is applicable.)

TABLE 2

Vibration Reduction

|  | Zone 1 | Zone 2 | Zone 3 | Zone 4 | Zone 5 | Zone 6 |
|---|---|---|---|---|---|---|
| Actuation Point (Top) | 97% | 97% | 95% | 90% | 88% | — |
| Middle Point | 96% | 94% | 92% | 86% | 76% | — |
| Actuation Point (Bottom) | 96% | 96% | 96% | 95% | 88% | — |

Table 3 shows the haptic effect with zone 4 as the driven zone, running at 160 Hz, 8.2 Vpp for 1 cycle.

TABLE 3

Acceleration P2P (G) - AST ON

|  | Zone 1 | Zone 2 | Zone 3 | Zone 4 | Zone 5 | Zone 6 |
|---|---|---|---|---|---|---|
| Actuation Point (Top) | 0.62 | 1.14 | 1.08 | 6.19 | 1.27 | 1.03 |
| Middle Point | 0.71 | 1.27 | 2.24 | 5.03 | 2.16 | 1.48 |
| Actuation Point (Bottom) | 1.04 | 1.05 | 1.29 | 6.40 | 1.05 | 1.01 |

Table 4 shows the haptic effect with zone 4 as the driven zone, running at 160 Hz, 7 Vpp for 1 cycle.

TABLE 4

Acceleration P2P (G) - AST OFF

|  | Zone 1 | Zone 2 | Zone 3 | Zone 4 | Zone 5 | Zone 6 |
|---|---|---|---|---|---|---|
| Actuation Point (Top) | 1.09 | 1.94 | 2.19 | 5.25 | 2.36 | 1.72 |
| Middle Point | 0.68 | 1.15 | 1.98 | 5.02 | 2.02 | 1.46 |
| Actuation Point (Bottom) | 1.21 | 1.72 | 2.47 | 5.19 | 2.41 | 1.81 |

Table 5 shows vibration reduction in the non-driven zones, with zone 4 as the driven zone.

TABLE 5

Acceleration P2P (G) -Target

|  | Zone 1 | Zone 2 | Zone 3 | Zone 4 | Zone 5 | Zone 6 |
|---|---|---|---|---|---|---|
| Actuation Point (Top) | 1.25 | 1.25 | 1.25 | — | 1.25 | 1.25 |
| Middle Point | 1.25 | 1.25 | 1.25 | — | 1.25 | 1.25 |
| Actuation Point (Bottom) | 1.25 | 1.25 | 1.25 | — | 1.25 | 1.25 |

To evaluate the performance of the controller a quality score can be defined. The quality score is a metric that can be used to compare performance of controllers or control parameters. One way of defining this metric is to compute the total difference with the target. For example, the values in Table 5 represent a quality score in which the quality score can be represented by:

Quality Score=$(Z1t-1.25)+(Z2t-1.25)+(Z6t-1.25)+(Z1t-1.25)+(Z2m-1.25)+(Z3m-1.25)+(Z5m-1.25)+(Z6m-1.25)+(Z1b-1.25)+(Z3b-1.25)+(Z6b-1.25)$ where Z represents the Zone, and t represents the top, m represents the middle, and b represents the bottom.

Thus, $Z1t$ corresponds to Zone 1 top point.

Table 6 shows the vibration with a target value of 0. In zone 4, the driven zone, the middle point of zone 4, which is the driven zone, shows a value of 5.

TABLE 6

| Acceleration P2P (G) -Target | | | | | | |
|---|---|---|---|---|---|---|
| | Zone 1 | Zone 2 | Zone 3 | Zone 4 | Zone 5 | Zone 6 |
| Actuation Point (Top) | 1.25 | 1.25 | 1.25 | — | 1.25 | 1.25 |
| Middle Point | 1.25 | 1.25 | 1.25 | 5 | 1.25 | 1.25 |
| Actuation Point (Bottom) | 1.25 | 1.25 | 1.25 | — | 1.25 | 1.25 |

Table 7 shows the vibration with the Active Sensing Technology (AST) turned off. While zone 4, the driven zone, shows the 0 values, representing full control, adjacent and non-adjacent zones are not controlled. Of note, zone 1 shows a zero value due to the relative distance of zone 1 from zone 4. The quality score is 8.33:

TABLE 7

| Quality Score - AST OFF | | | | | | |
|---|---|---|---|---|---|---|
| | Zone 1 | Zone 2 | Zone 3 | Zone 4 | Zone 5 | Zone 6 |
| Actuation Point (Top) | 0.00 | 0.69 | 0.94 | 0.00 | 1.11 | 0.47 |
| Middle Point | 0.00 | 0.00 | 0.73 | 0.00 | 0.77 | 0.21 |
| Actuation Point (Bottom) | 0.00 | 0.47 | 1.22 | 0.00 | 1.16 | 0.56 |

Table 8 shows the vibration reduction using a haptic controller quality score=2.21.

TABLE 8

| Quality Score - AST ON | | | | | | |
|---|---|---|---|---|---|---|
| | Zone 1 | Zone 2 | Zone 3 | Zone 4 | Zone 5 | Zone 6 |
| Actuation Point (Top) | 0.00 | 0.00 | 0.00 | 0.00 | 0.02 | 0.00 |
| Middle Point | 0.00 | 0.02 | 0.99 | 0.00 | 0.91 | 0.23 |
| Actuation Point (Bottom) | 0.00 | 0.00 | 0.04 | 0.00 | 0.00 | 0.00 |

As mentioned, the MIMO implementation differs from the SISO implementation in that the MIMO configuration implements a control linkage between each controller, providing control outputs from each controller to the other controllers. The input signal for the SISO controller is the measured signal, e.g., acceleration, and the output is the drive signal for the actuator. In the MIMO controller, the input is the measured signals, e.g., acceleration, but the outputs incorporate the outputs of the other controllers. Therefore, in SISO, all controllers are decoupled from each other and work independently, whereas in MIMO, the controller output for each zone is connected to the input of the other zones' controllers. Thus, to a greater extent, the SISO implementation is more dependent on the use of a predictive algorithm to control the vibration at adjacent and non-adjacent zones.

Figure 10:
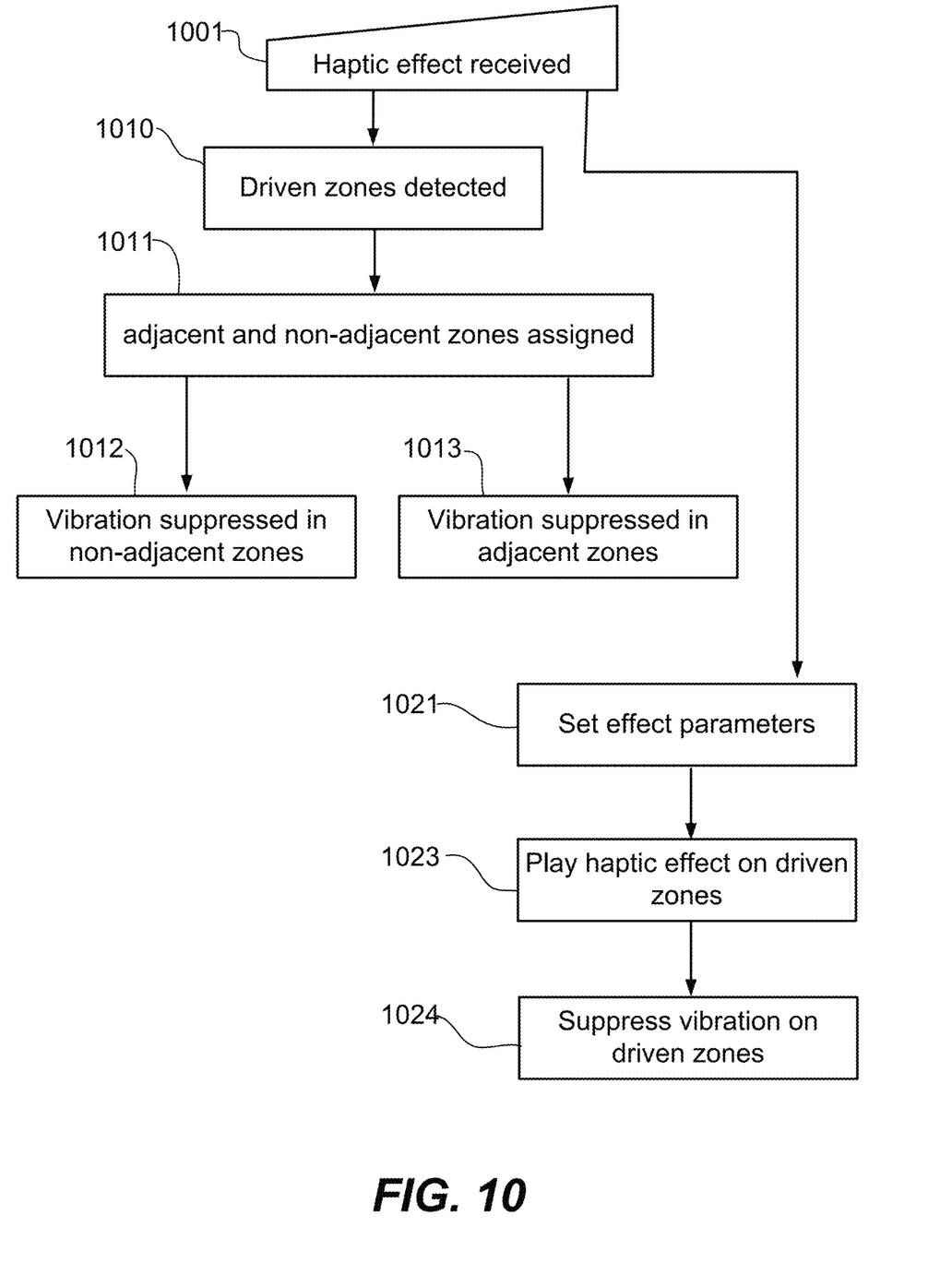
FIG. 10 is a flow chart showing a process according to the disclosed technique in accordance with aspects.

FIG. 10 is a flow chart showing a process according to the disclosed technique. A haptic effect request is received (step 1001). In response to the received haptic effect, driven zones are detected (step 1010), and adjacent and non-adjacent zones are assigned (step 1011). Vibration is reduced and/or suppressed in non-adjacent zones (step 1012) in accordance with associated control parameters for the non-adjacent zones. Vibration is reduced and/or suppressed in adjacent zones (step 1013) in accordance with associated control parameters for the adjacent zones.

Also, in response to the received request for a haptic effect (step 1001), effect parameters are set (step 1021). The effect parameters can include, but are not limited to amplitude, frequency, duration, and other haptic effect characteristics. The haptic effects for the driven zones is played in the driven zones (step 1023). Following playing the haptic effects or as part of the playing of the haptic effects, the vibration on driven zones with associated control parameters for driven zones is suppressed (step 1024).

Figure 11:
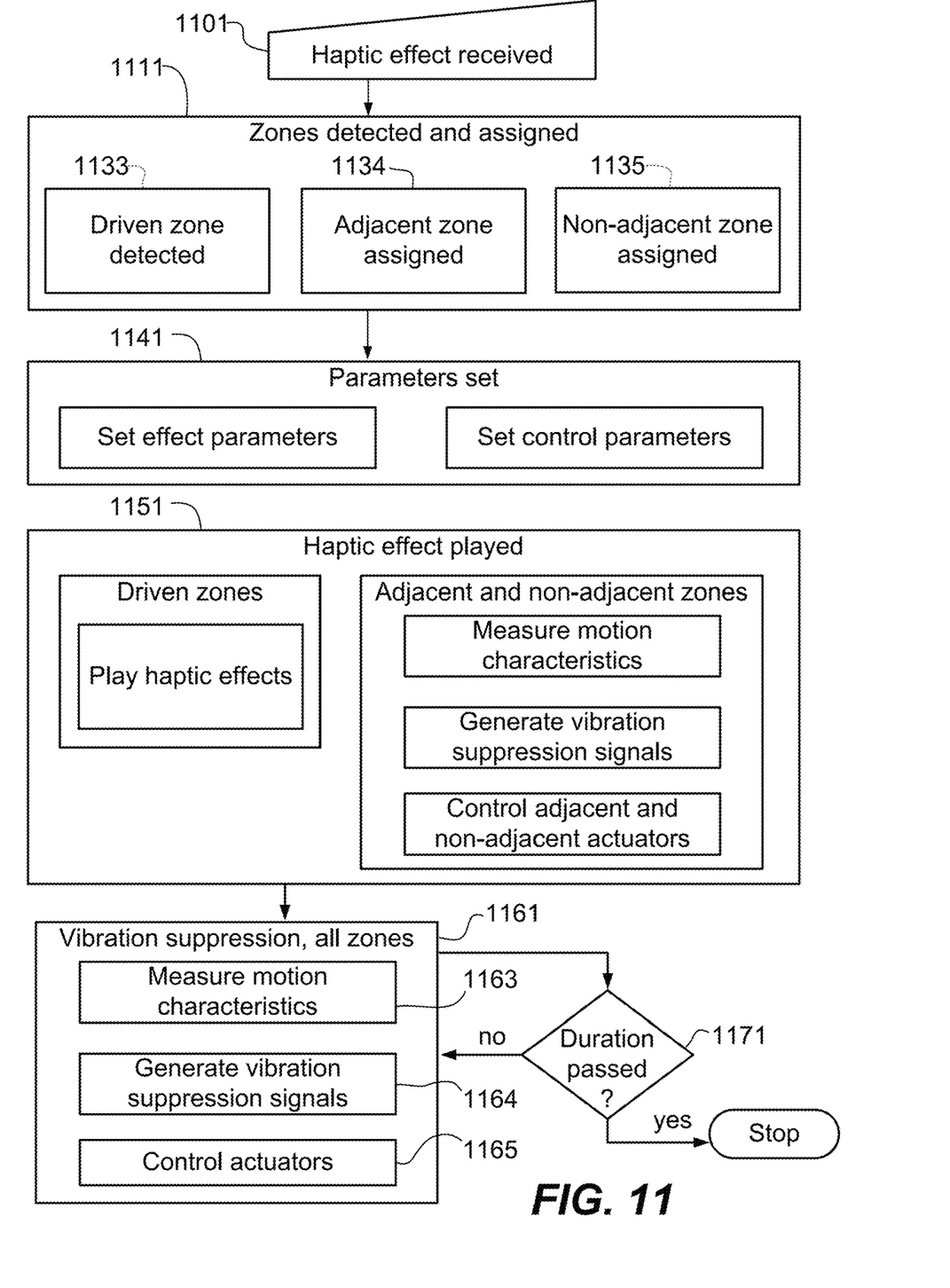
FIG. 11 is a flow chart showing details of the process of FIG. 10 in accordance with aspects.

FIG. 11 is a flow chart showing details of the process of FIG. 10. Upon receiving the request for the haptic effect (step 1101), driven and non-driven zones are detected and assigned (step 1111). The detection and assignment includes detection of the driven zones (step 1133), and assigning of adjacent (step 1134) and non-adjacent (step 1135) zones.

Also, upon receiving the request for the haptic effect (step 1101), effect parameters are set (step 1141), followed by playing the haptic effects (step 1151).

For the driven, and for the adjacent and non-adjacent zones, a second series of steps provides vibration suppression (step 1161). The vibration suppression (step 1161) includes measuring motion characteristics (step 1163), followed by generating a vibration reduction and/or suppression signal (step 1164) and applying control parameters (step 1165) according to the associated adjacent zone control parameters for the respective driven zones adjacent zones and non-adjacent zones as determined in step 1111.

A determination is made (step 1171) of whether the effect duration has passed. If the effect duration has not passed, the sequences of measuring motion characteristics, vibration suppression and control (steps 1163, 1164 and 1165) are repeated. When the effect duration has passed, the sequence is stopped. After the effect duration and vibration reduction and/or suppression, there is no controller output. The remaining vibration in the system slow and/or at a minimum and the rest will dissipate by physics of the system and without any controller effect duration is a controller parameter and can be set to desired minimization.

As indicated, an AST or non-AST system can also incorporate proportional suppression, sometimes referred to as a "brake controller". In one configuration a lead/lag compensator was placed in series with a PID controller of AST. In another configuration, the PID controller was replaced with lead/lag and lag/lead controllers. The advantage of using this style of controller is increased vibration suppression as well as more robust and easier tuning of the controller. With additional tuning parameters, improved and/or optimized tuning is more achievable.

It is also possible to provide the system by use of the above-described MIMO controller, in which the output signal of the actuators is used as an input for vibration suppression zones. This technique increases the vibration suppression performance. Measured phase delay is essential in generating the input for the anti-vibration actuators. The MIMO controller can be considered as the general case for the vibration suppression controller. At least one input of the controller should be measurement of motion characteristics. Pure feed forwarding of drive signals can also be used. Predictive algorithms and filters can also be implemented in the controller It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method of providing a haptic effect in a first zone of a plurality of predetermined zones, the method comprising;
    employing closed-loop feedback to control at least one actuator included in the first zone to provide the haptic effect;
    determining at least one of an adjacent zone of the first zone and a non-adjacent zone of the first zone; and
    employing closed-loop feedback to control at least one actuator included in the determined at least one of an adjacent zone and non-adjacent zone to reduce or suppress the haptic effect in such zone, said control of at least one actuator included in the determined at least one of an adjacent zone and non-adjacent zone effected to reduce or suppress the haptic effect in such zone based on at least one of feedback information associated with the at least one actuator included in the first zone and feed forward information associated with the at least one actuator included in the first zone.

2. The method of claim 1, wherein:
    said determining at least one of an adjacent zone of the first zone and a non-adjacent zone of the first zone includes determining at least one adjacent zone of the first zone and determining at least one non-adjacent zone of the first zone; and
    said controlling at least one actuator included in the determined at least one adjacent zone and non-adjacent zone to reduce or suppress the haptic effect in such zone includes controlling at least one actuator in the determined at least one adjacent zone to reduce or suppress the haptic effect in the at least one adjacent zone and controlling at least one actuator in the determined at least one non-adjacent zone to reduce or suppress the haptic effect in the at least one non-adjacent zone.

3. The method of claim 1, wherein:
    said controlling at least one actuator included in the first zone to provide the haptic effect includes controlling the at least one actuator included in the first zone using first zone control parameters; and
    said controlling at least one actuator included in the determined at least one adjacent zone and non-adjacent zone to reduce or suppress the haptic effect in such zone includes at least one of controlling the at least one actuator in the determined at least one adjacent zone using adjacent zone control parameters and controlling the at least one actuator in the determined at least one non-adjacent zone using non-adjacent zone control parameters.

4. The method of claim 1, wherein:
    said controlling at least one actuator included in the determined at least one adjacent zone and non-adjacent zone to reduce or suppress the haptic effect in such zone is based on at least one of feedback information associated with the at least one actuator included in the first zone and feed forward information associated with the at least one actuator included in the first zone.

5. The method of claim 1, wherein the plurality of predetermined zones are included in one or more portions of a surface.

6. An apparatus for providing a haptic effect in a first zone of a plurality of predetermined zones, comprising;
    a processor configured to:
    employing closed-loop feedback to control at least one actuator included in the first zone to provide the haptic effect;
    determine at least one of an adjacent zone of the first zone and a non-adjacent zone of the first zone; and
    employ closed-loop feedback to control at least one actuator included in the determined at least one of an adjacent zone and non-adjacent zone to reduce or suppress the haptic effect in such zone, said control of at least one actuator included in the determined at least one of an adjacent zone and non-adjacent zone effected to reduce or suppress the haptic effect in such zone based on at least one of feedback information associated with the at least one actuator included in the first zone and feed forward information associated with the at least one actuator included in the first zone.

7. The apparatus of claim 6, wherein:
    said determine at least one of an adjacent zone of the first zone and a non-adjacent zone of the first zone includes determine at least one adjacent zone of the first zone and determine at least one non-adjacent zone of the first zone; and
    said control at least one actuator included in the determined at least one adjacent zone and non-adjacent zone to reduce or suppress the haptic effect in such zone includes control at least one actuator in the determined at least one adjacent zone to reduce or suppress the haptic effect in the at least one adjacent zone and control at least one actuator in the determined at least one non-adjacent zone to reduce or suppress the haptic effect in the at least one non-adjacent zone.

8. The apparatus of claim 6, wherein:
    said control at least one actuator included in the first zone to provide the haptic effect includes control the at least one actuator included in the first zone using first zone control parameters; and
    said control at least one actuator included in the determined at least one adjacent zone and non-adjacent zone to reduce or suppress the haptic effect in such zone includes at least one of control the at least one actuator in the determined at least one adjacent zone using adjacent zone control parameters and controlling the at least one actuator in the determined at least one non-adjacent zone using non-adjacent zone control parameters.

9. The apparatus of claim 6, wherein said control at least one actuator included in the determined at least one adjacent zone and non-adjacent zone to reduce or suppress the haptic effect in such zone is based on at least one of feedback information associated with the at least one actuator included in the first zone and feed forward information associated with the at least one actuator included in the first zone.

10. The apparatus of claim 6, wherein the plurality of predetermined zones are included in one or more portions of a surface.

11. A computer program product, comprising:
    a non-transitory computer-readable medium having one or more instructions thereon that, when executed by a processor, cause the processor to:
    employing closed-loop feedback to control at least one actuator included in the first zone to provide the haptic effect;
    determine at least one of an adjacent zone of the first zone and a non-adjacent zone of the first zone; and
    employ closed-loop feedback control at least one actuator included in the determined at least one of an adjacent zone and non-adjacent zone to reduce or suppress the haptic effect in such zone, said control of at least one actuator included in the determined at least one of an adjacent zone and non-adjacent zone effected to reduce or suppress the haptic effect in such zone based on at least one of feedback information associated with the at least one actuator included in the first zone and feed forward information associated with the at least one actuator included in the first zone.

12. The computer program product of claim 11, wherein:

said determine at least one of an adjacent zone of the first zone and a non-adjacent zone of the first zone includes determine at least one adjacent zone of the first zone and determining at least one non-adjacent zone of the first zone; and said control at least one actuator included in the determined at least one adjacent zone and non-adjacent zone to reduce or suppress the haptic effect in such zone includes control at least one actuator in the determined at least one adjacent zone to reduce or suppress the haptic effect in the at least one adjacent zone and control at least one actuator in the determined at least one non-adjacent zone to reduce or suppress the haptic effect in the at least one non-adjacent zone.

13. The computer program product of claim 11, wherein:

said control at least one actuator included in the first zone to provide the haptic effect includes controlling the at least one actuator included in the first zone using first zone control parameters; and said control at least one actuator included in the determined at least one adjacent zone and non-adjacent zone to reduce or suppress the haptic effect in such zone includes at least one of control the at least one actuator in the determined at least one adjacent zone using adjacent zone control parameters and control the at least one actuator in the determined at least one non-adjacent zone using non-adjacent zone control parameters.

14. The computer program product of claim 11, wherein:

said control at least one actuator included in the determined at least one adjacent zone and non-adjacent zone to reduce or suppress the haptic effect in such zone is based on at least one of feedback information associated with the at least one actuator included in the first zone and feed forward information associated with the at least one actuator included in the first zone.

* * * * *